Sept. 14, 1954

A. V. HUGHES 2,688,945

JET TORPEDO CASING

Filed April 18, 1946

INVENTOR
Arthur V. Hughes.
BY
Paul E. Friedemann
ATTORNEY

Sept. 14, 1954  A. V. HUGHES  2,688,945
JET TORPEDO CASING

Filed April 18, 1946  7 Sheets-Sheet 4

INVENTOR
Arthur V. Hughes
BY
Paul E. Friedemann
ATTORNEY

Sept. 14, 1954  A. V. HUGHES  2,688,945
JET TORPEDO CASING

Filed April 18, 1946 7 Sheets-Sheet 5

INVENTOR
*Arthur V. Hughes*
BY
*Paul C. Friedemann*
ATTORNEY

Sept. 14, 1954     A. V. HUGHES     2,688,945
JET TORPEDO CASING Filed April 18, 1946     7 Sheets-Sheet 7

Fig. 11.

INVENTOR
*Arthur V. Hughes.*
BY
*Paul C. Friedemann*
ATTORNEY

Patented Sept. 14, 1954

2,688,945

UNITED STATES PATENT OFFICE 2,688,945

JET TORPEDO CASING

Arthur V. Hughes, Sharon, Pa., assignor, by mesne assignments, to the United States of America as represented by the Secretary of the Navy Application April 18, 1946, Serial No. 663,203

17 Claims. (Cl. 114—20)

My invention relates to torpedo casing structures, and, more particularly, to suspension and supporting structures for the motor of a rocket propelled torpedo and to sealing means for the torpedo and propulsion motor.

A rocket propelled torpedo, or hydro-bomb, is usually launched from a plane. Since such launching involves high impact forces and since the propulsion motor is very much heavier than the motor of an electrically propelled torpedo, a number of special problems arise in conjunction with the torpedo structure and the supports for the rocket motor.

One object of my invention is the provision of supporting structures for the rocket motor of a rocket propelled torpedo having such special features that the entire assembly will withstand the shock incident to launching of the torpedo from a plane moving at a high speed.

Another object of my invention is the provision of a torpedo structure and sealing means that sea water will be prevented from entering the torpedo shell under normal operating conditions.

Another object, namely, a somewhat more specific object, of my invention, is the provision of structures that will prevent the mounting of a rocket motor in the torpedo shell except certain elements of the control system for the rocket motor igniter are in a given position.

The objects hereinabove stated are merely illustrative of the objects of my invention. Other objects and advantages will become more apparent from a study of the following specification and the accompanying drawings, in which:

Figure 1:
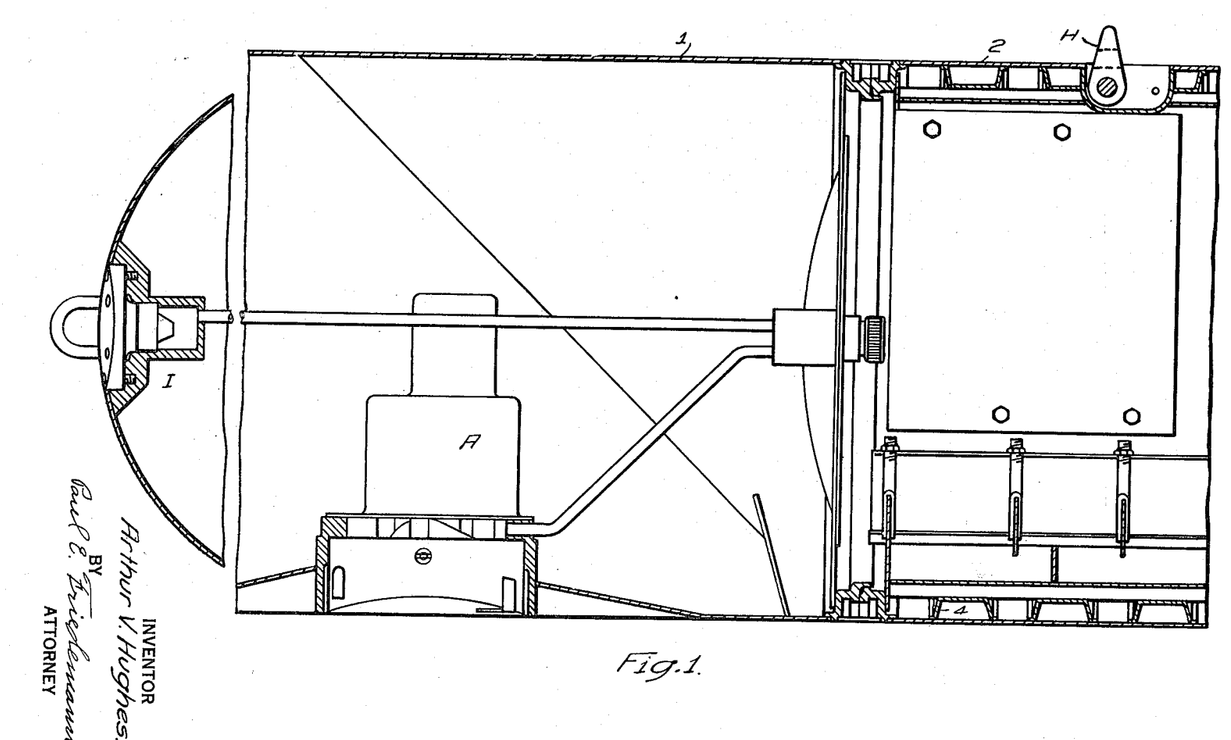
Figure 1 illustrates, in longitudinal section, the forward end of the torpedo built in accordance with my invention.
Figure 2:
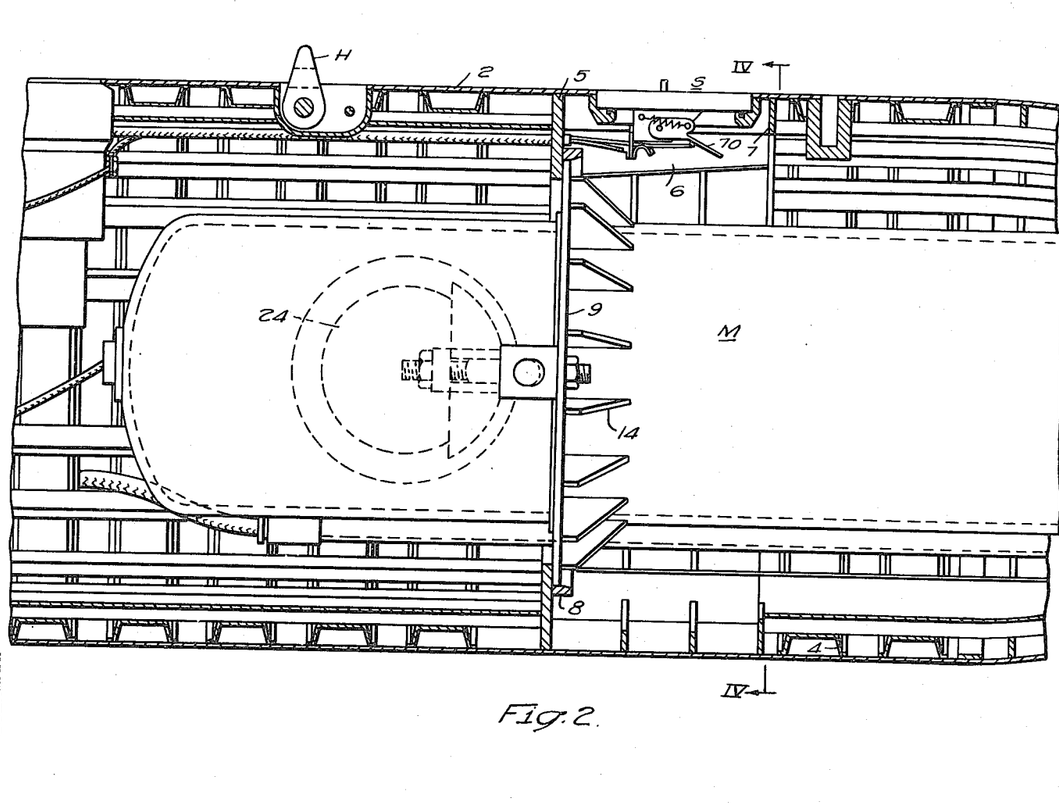
Fig. 2 is a showing, in longitudinal section, of some essential features of my invention disposed in the mid-region of the torpedo.
Figure 3:
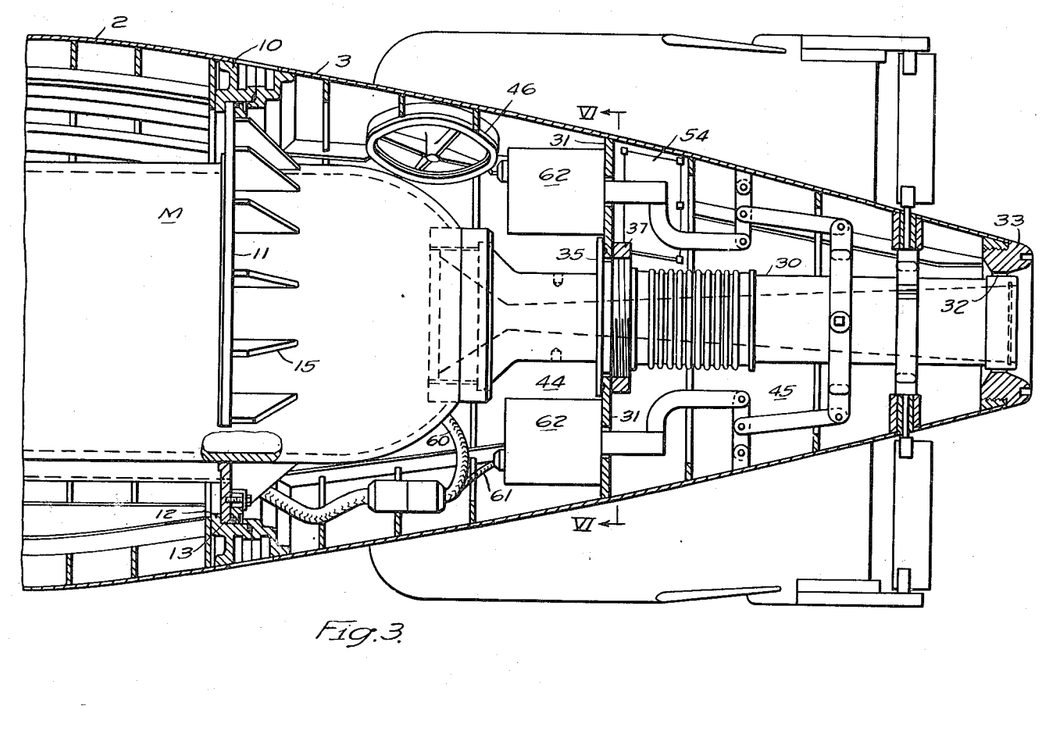
Fig. 3 is a longitudinal sectional view of the tailcone.
Figure 4:
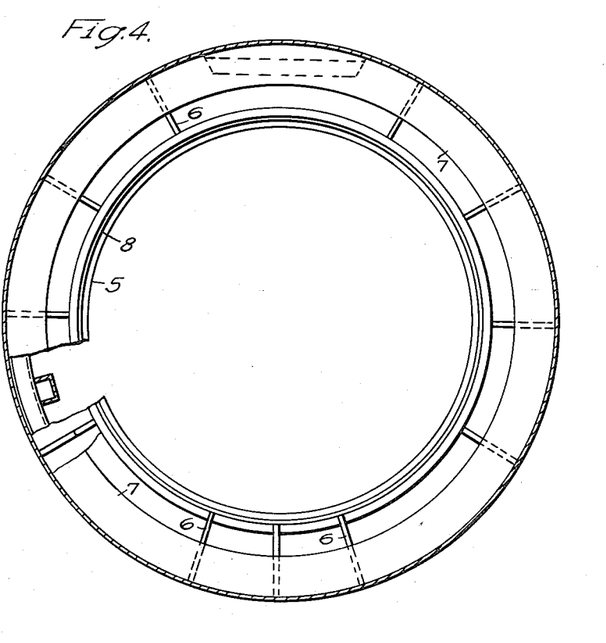
Fig. 4 is a transverse sectional view on section line IV—IV of Fig. 2.

From an inspection of Figures 1, 2 and 3, it will be apparent that the torpedo, or hydro-bomb, has a shell contour of conventional appearance. The conventional torpedo shell assembly usually has four sections, has an outside diameter of twenty-one inches, and the shell walls are usually no more than one-eighth of an inch thick.

A hydro-bomb is subject to high stresses on impact with the sea, the rocket motor is large and heavy and produces an extremely large propulsive force. These and other considerations make it necessary to build the hydro-bomb with but three sections, the warhead or exercise head 1, the center section 2, and the tailcone 3. The wall thickness is larger and built with stronger reenforcing ribs 4 and the outside diameter is greater than the dimensions of these same elements in a conventional torpedo.

Approximately midway along the length of the center section 2 is located the forward support or thrust ring 5 for the rocket motor M. This ring comprises a flat annulus of steel, or other strong metal, welded along its outer periphery to the inner surface of the torpedo shell. To give this ring 5 the very maximum strength, it is supported at circumferentially spaced intervals by a plurality of flat gussets 6 extending in the aft direction. These gussets have the shape of a trapezoid having one edge perpendicular to the two parallel edges and the fourth edge at a slant to the parallel edges. The parallel edges are disposed radially of the torpedo axis and the edge normal to the parallel edges is disposed against the inner surface of the torpedo shell. The longer of the two parallel edges is disposed contiguous the ring 5. A second flat ring, or annulus 7 is welded to the inner surface of the torpedo shell at the region contiguous to the aft edges of the gussets. The gussets 6 are securely welded to the inner surface of the torpedo shell and to the rings 5 and 7 to thus form a very rigid and strong connection between the ring 5 and the torpedo shell.

Another ring 8 is concentrically welded to the aft face of ring 5. The ring 8 has a slightly larger internal diameter at its aft end but for a portion of its forward axial length is of lesser internal diameter and is machined to very close tolerance with reference to the forward mounting ring 9 of the rocket motor. The forward face of the forward mounting ring 9 and the aft face of the thrust ring 5 are also machined to close tolerances. The mounting ring 9 may thus, in view of the shape of ring 8, be readily inserted in ring 8, but once in position a very snug fit is thus provided for the forward mounting ring 9. The ring 5 thus resists axial launching shocks and the ring 8 resists lateral, or radial launching shocks.

A special design of joint ring 10 at the aft end of the center section 2 provides the support for the aft support ring 11 for the jet motor M. A radially projecting lip 12 on the forward inner periphery of the joint ring 10 provides the means for arresting any motion of the aft motor support ring 11 in the forward direction. Lateral or radial motion of the ring 11 is prevented by contact with the inner periphery 13 of the joint ring 10. The forward support ring 9 as well as the aft support ring 11 are welded to the heavy case of the jet motor. To provide added strength, these rings are provided with the fins 14 and 15, respectively, welded to the rings and the motor case.

The jet motor M is loaded into the torpedo by standing the center section on end with the forward end down and then lowering the motor M into section 2. In view of the shape of ring 8, the ring 9 is readily slipped into its snug fitting relation to rings 5 and 8. The design is such that the forward motor mounting ring 9 will pass through joint ring 10 at the lip 12.

With ring 9 in correct position with reference to rings 5 and 8, the machining tolerances are so chosen that there is a slight clearance between forward face of ring 11 and the aft face of lip 12. Hence during the initial phase of the impact with the sea, the forward rings 5, 8 and 9 will bear the full load. However, when the forward support ring deflects sufficiently under the load imposed, the aft motor support ring 11 engages lip 12 and the load is thus shared by both supports as further deflection of ring 5 takes place.

Figure 5:
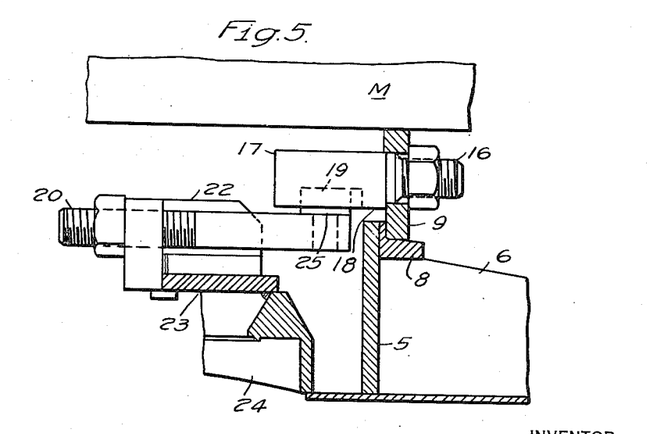
Fig. 5 is a showing in detail of one of the pull-up lugs for the rocket motor of the torpedo.

In order to insure good contact between the rings 5 and 8, and the ring 9 and to prevent rebound of the motor M in the aft direction during impact, a pull-up lug assembly is used at the forward rings 5, 8 and 9. Usually two suffice. One of these devices is shown in Fig. 5.

The ring 9 is provided with a hole for receiving the aft end of bolt 16 provided with a lug 17 at the forward end having a shoulder 18 and having a recess 19. By means of the nut shown and the shoulder 18, the bolt 16 is firmly positioned in ring 9. A bolt 20 having a lug 21 is disposed between two sturdy lugs 22 welded to the frame 23 rigidly welded to the torpedo frame at the region of a hand-hole 24. By positioning the lug 21 in the recess 19 and tightening the nut on bolt 20, the ring 9 is firmly drawn up against rings 5 and 8. One of these assemblies is disposed at each horizontal side of the torpedo at the region of a hand-hole so that tightening of the motor M in position may be made after the torpedo is otherwise completely assembled. The details of this jack-screw assembly may be varied but the important thing is that a jack-screw assembly is used to pull up the motor.

Figure 9:
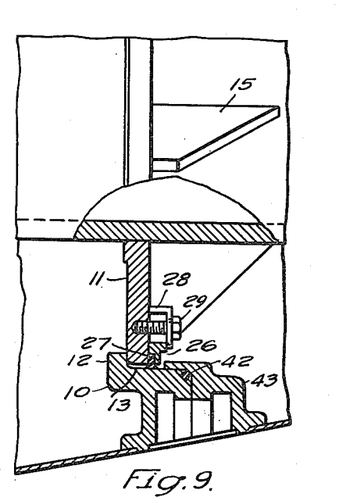
Fig. 9 is a very near full size showing in section of the sealing means between the tailcone and midsection and the rocket motor.

After the motor M is firmly in place on rings 5 and 8 and the joint ring 10, a sealing ring and gasket assembly 25 is disposed at the aft outer surface of the ring 11. This assembly 25 comprises a ring 26, shaped as shown, and a rubber, or neoprene, gasket ring 27, circular in section when not compressed, disposed between the ring 26. A plurality of L-shaped clamps are so disposed that one leg of the clamps abuts the aft surface of ring 26 and the end of the other leg rests against the aft surface of ring 11. By means of the bolts 29 threaded into ring 11 and engaging the ring 26, the gasket ring 27 is compressed, as shown, to form a liquid-tight seal between rings 10 and 11.

After the sealing ring and gasket assembly 25 is in position, the tailcone 3 is bolted to the center section 2.

It should be noted that the nozzle 30 of the jet motor passes through the opening in the partition 31 in the tailcone. A clearance 34 of about one-eighth of an inch is provided between the nozzle and the inner surface of the opening in the externally threaded sleeve element 35. A similarly dimensioned clearance is also provided at 32 between inner periphery of the aft end 33 of the tailcone. This sleeve element 35 has a radial flange 36 coacting with a gasket disposed in an annular recess in the partition 31. A nut 37 surrounds the sleeve element 35. When the nut 37 is screwed onto the threads of element 35, a fluid-tight seal is provided between the flange 36 and the partition 31.

Figure 11:
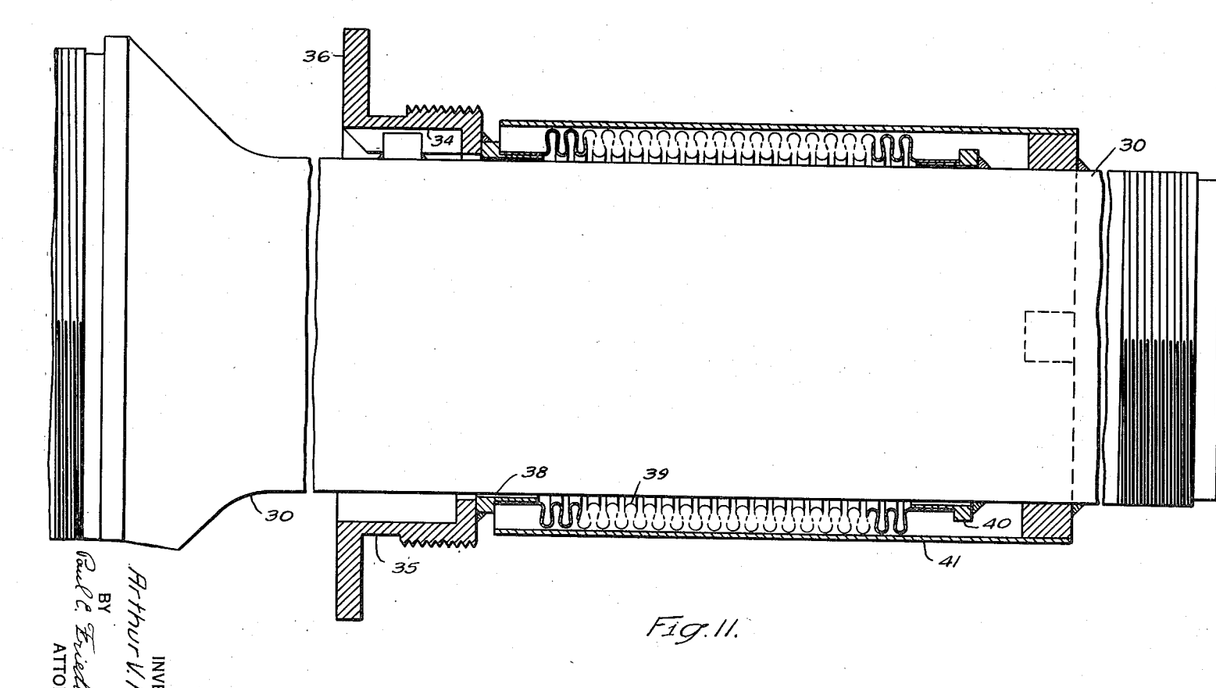
Fig. 11 is a side view with certain parts in section and to full scale of the elastic sealing means at the nozzle structure for the rocket motor.

A sleeve member 38 is hermetically welded to the aft end of the sleeve element 35 and the forward end of a sleeve bellows 39 is hermetically secured, as by soldering, brazing or welding, to the aft end of the sleeve member 38. The aft end of the bellows is hermetically secured, as by welding, brazing or soldering, to the sleeve member 40 hermetically welded to the nozzle 30. To protect the bellows 39, a cylindrical sleeve 41, secured to the nozzle 30, as shown, is disposed over the bellows 39.

This bellows-nozzle assembly provides another fluid-tight seal at the tailcone bulkhead 31. Since a gasket 42 is disposed between the joint ring 10 and joint ring 43 and the bellows-nozzle assembly provides a fluid-tight seal at the partition, or bulkhead 31, the region 44 is effectively sealed off from the region 45.

Access to the nut 37 and nozzle 30, to provide the bellows-nozzle seal assembly, is provided through the hand-hole 54. The assembly steps are such that after the nozzle 30 is screwed into the aft end of the jet motor the nut 37 is screwed onto the sleeve element.

The clearances 32 and 34 allow the jet motor casing, which becomes quite hot during operation, to expand in the aft direction since the jet motor casing is rigidly fastened to the torpedo casing at one region only, namely, the region of ring 5. The bellows-nozzle assembly being flexible and providing a flexible seal thus allows the nozzle 30 to move in the aft direction. Also the bellows-nozzle seal assembly allows greater tolerances to be used in the machining of the jet motor because the nozzle 30 need not be concentric to a high degree with the motor mounting ring machined surfaces.

Figure 6:
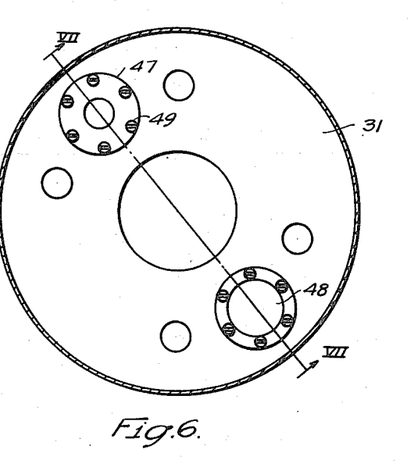
Fig. 6 is a transverse sectional view of the tailcone on section line VI—VI.
Figure 7:
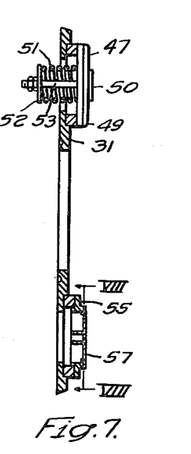
Fig. 7 is a sectional showing, on section line VII—VII of Fig. 6, of some details.
Figure 8:
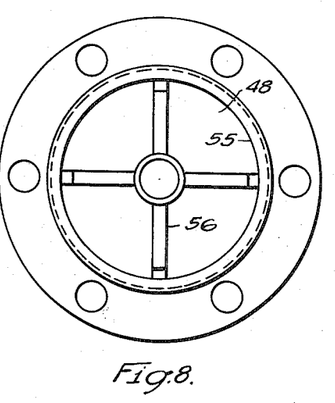
Fig. 8 is an enlarged showing of some details taken on section line VIII—VIII of Fig. 7.

A further explanation of the sealing system used requires a description of the tailcone bulkhead blowout disc and discharge valve. The details of this mentioned structure are shown in Figs. 6, 7 and 8. Fig. 6 shows the position of the discharge valve 47 and the blowout disc 48.

The discharge valve 47 comprises a plate 49 bolted over an opening in the bulkhead, or partition, 31. The plate is provided with a central opening and an aft seat for the valve head 50. A compression spring 51 of suitable design and under suitable adjusted compression disposed about the rod 53 secured to the valve head 50 and between the plate 49 and washer 52 firmly holds the valve head 50 in position on the valve seat. The arrangement is such that, when a fluid pressure in region 44 develops that is in excess by a given value, as eight pounds per square inch, to the pressure of the sea water in region 45 of the tailcone, the discharge valve opens in the aft direction to relieve the pressure in region 44.

The blowout disc details are shown in Figs. 7 and 8. This arrangement consists of an annular steel ring 55 having a rather large central opening and provided with a four-spoked spider 56. The ring is hermetically secured to the bulkhead by suitable bolts, as shown in Fig. 6. A thin sheet of copper 57 is soldered or brazed to the ring 55 to provide a hermetic seal. The spider 56 provides a backing for the copper sheet to give it strength and backing to pressure forces applied from the region 45.

The manner in which the disc 57 is mounted permits ripping of the disc 57 from its soldered joint provided the pressure in region 44 rises to a sufficient magnitude. If the pressure in region 44 exceeds by approximately 100 p. s. i. the pressure in region 45, the copper sheet ruptures in the aft direction thus relieving the pressure in region 44.

The purpose and useful function of the discharge valve and blowout disc may now be explained. If, when the jet motor is fired, a failure occurs in the motor ignition system it may, and most likely will, take the form of a sudden buildup of pressure within the jet motor of such magnitude as to rupture the aft end of the jet motor where the heat is most intense. The hot gases thus discharge into the region 44. The blowout disc 57 is thus caused to rupture.

The large volume of hot gases thus discharged into region 44 must be discharged immediately. Sufficient pressure could be developed in region 44 to rupture the entire tailcone. However, before the tailcone is ruptured the blowout disc in the bulkhead 31 blows out and the discharge valve is opened discharging the gases from region 44 into the water at a rate equal to that at which the gases enter from the rupture in the aft end of the jet motor.

Once the bulkhead blowout disc 57 has been ruptured, water will enter the region 44 through the bulkhead when the motor has burned out. The purpose of the gasket and ring assembly 25 at the aft motor mounting ring 11 is to prevent this water from flooding the entire torpedo and thus damaging the expensive control instruments in the center section 2. The torpedo is so designed that even with this tailcone section or region 44 flooded, sufficient buoyancy exists at the end of an exercise run to float the torpedo.

Figure 10:
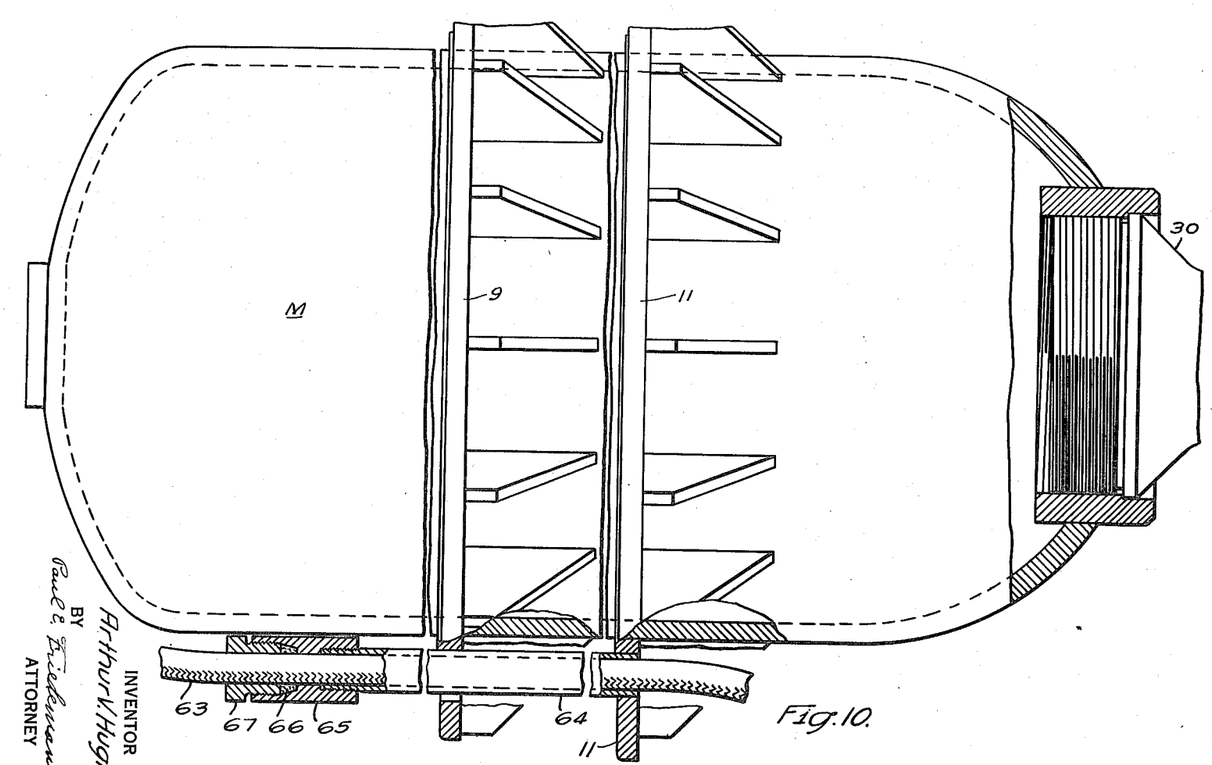
Fig. 10 shows some details of mounting of a control cable in relation to the rocket motor.

Attention is called in this connection to the structure used in bringing the leads 60 and 61 for the steering control solenoids 62 and jet motor igniter (not shown) from the center section 2 to the region 44. The cable 63 carrying the leads 60 and 61 issues from a pipe 64 hermetically welded into an opening in ring 11. The forward end of the pipe is provided with a nipple 65, a packing 66 and a sleeve nut 67. This assembly constitutes a packing gland, namely, an effective seal that prevents any water or gases in region 44 from entering section 2 by leakage along the cable 63.

Even during normal operation sufficient gas from the jet motor may escape around the threads of the nozzle, the igniter, and safety blowout discs that may be provided in the aft end of the jet motor to build up a pressure in region 44 sufficiently great, if not relieved sufficiently by the discharge valve 47, to rupture the blowout disc 57 in the tailcone bulkhead 31. The purpose of the discharge valve 47 is to relieve the pressure of escaping gases and keep the tailcone dry during normal runs.

While I have shown other structures in the drawings than those that have been discussed in detail such other structures aid in gaining a more comprehensive picture of the entire assembly and function of my invention even though such other structures do not form part of my invention.

For example, I constitutes the inertia responsive firing mechanism for the explosive, as torpex, in the warhead 1, and A constitutes the arming mechanism actuated by a suitable impeller driven by the sea water.

On section 2 I dispose a pair of disappearing hooks H used to suspend the torpedo from a suitable electromagnetically releasable supporting element of the launching plane. It is also important that the igniter circuit is not accidentally closed. To prevent this, a water-trip switch S is provided in the igniter circuit. This switch normally closes after the torpedo strikes the water. This switch is provided with an arm 70 which will be in a vertical position if the switch is closed. It is thus not possible to mount a jet motor in the torpedo since ring 9 will not pass the arm 70. For the electric control used with this type of torpedo reference may be had to my copending application, filed January 15, 1946, Serial No. 641,377, and entitled Electrical Control.

While I have discussed but one embodiment of my invention and some of the apparatus details that are needed I do not wish to be limited to the exact details described but wish to be limited only by the scope of the appended claims.

I claim as my invention:

1. A torpedo of the jet propelled type normally launched from a plane, in combination, a torpedo housing built up of three sections namely, a front section, which may be either a warhead or an exercise head, a middle section, and a tailcone, a jet motor comprising an elongated cylindrical casing, means for rigidly securing the front portion of the jet motor in the middle section so that the front portion is prevented from any movement in the forward direction in the aft direction and in the lateral direction, means disposed at the junction of the middle section and tailcone for so engaging the aft region of the jet motor that the jet motor at this region is prevented from forward movement and lateral movement but is free to move in the aft direction, whereby no stresses are placed on the torpedo shell by reason of the expansion of the jet motor because of the intense rise in temperature to which it is subjected when in operation, a bulkhead in the tailcone, and a nozzle rigidly secured to the aft end of the jet motor and projecting through the tailcone to the very aft end of the torpedo, said nozzle being disposed in spaced relation to the tailcone bulkhead and other tailcone elements to permit free relative movement between the nozzle and tailcone elements upon expansion of the jet and nozzle.

2. A torpedo of the jet propelled type normally launched from a plane, in combination, a torpedo housing built up of three sections namely, a front section, which may be either a warhead or an exercise head, a middle section, and a tailcone, a jet motor comprising an elongated cylindrical casing, means for rigidly securing the front portion of the jet motor in the middle section so that the front portion is prevented from any movement in the forward direction in the aft direction and in the lateral direction, means disposed at the junction of the middle section and tailcone for so engaging the aft region of the jet motor that the jet motor at this region is prevented from forward movement and lateral movement but is free to move in the aft direction, whereby no stresses are placed on the torpedo shell by reason of the expansion of the jet motor because of the intense rise in temperature to which it is subjected when in operation, a bulkhead in the tailcone, a nozzle rigidly secured to the aft end of the jet motor and projecting through the tailcone to the very aft end of the torpedo, said nozzle being disposed in spaced relation to the tailcone bulkhead and other tailcone elements to permit free relative movement between the nozzle and tailcone elements upon expansion of the jet motor and nozzle, and a flexible seal between the bulkhead and nozzle to effectively seal the regions on the two sides of the bulkhead from each other.

3. In a jet propelled torpedo, in combination, a torpedo shell, a flat bearing ring rigidly welded at its outer periphery to the inner periphery of the shell, a torpedo tailcone, a joint ring for joining said tailcone to the shell, said joint ring being provided with an aft bearing surface falling in a plane normal to the torpedo axis, a jet motor comprising a housing having a nozzle secured to the aft end thereof projecting in the aft direction so that the nozzle opening is at the aft end of the tailcone, a thrust transmitting ring rigidly secured near the forward region of the jet motor housing, said thrust transmitting ring having a lesser outer diameter than the inner diameter of the joint ring whereby the jet motor may be inserted into the shell through the joint ring so that the thrust transmitting ring rests on the bearing surface of the first mentioned ring, a second thrust transmitting ring rigidly secured at a region of the jet motor housing so that this last mentioned thrust transmitting ring is adjacent and in facing relation to the bearing surface on the joint ring when the first thrust transmitting ring and the bearing surface of the first mentioned ring are in bearing contact.

4. In a jet propelled torpedo, in combination, a torpedo shell, a flat bearing ring rigidly welded at its outer periphery to the inner periphery of the shell, a plurality of radially disposed and circumferentially spaced flat plates welded to the aft surface of the ring and to the inner periphery of the shell said plates having a lesser width in the radially directed dimension than the radial width of the ring so that the ring provides an aft bearing surface, a torpedo tailcone, a joint ring for joining said tailcone to the shell, said joint ring being provided with an aft bearing surface falling in a plane normal to the torpedo axis, a jet motor comprising a housing having a nozzle secured to the aft end thereof projecting in the aft direction so that the nozzle opening is at the aft end of the tailcone, a thrust transmitting ring rigidly secured near the forward region of the jet motor housing, said thrust transmitting ring having a lesser outer diameter than the inner diameter of the joint ring whereby the jet motor may be inserted into the shell through the joint ring so that the thrust transmitting ring rests on the bearing surface of the first mentioned ring, a second thrust transmitting ring rigidly secured at a region of the jet motor housing so that this last mentioned thrust transmitting ring is adjacent and in facing relation to the bearing surface on the joint ring when the first thrust transmitting ring and the bearing surface of the first mentioned ring are in bearing contact.

5. In a jet propelled torpedo, in combination, a torpedo shell, a flat bearing ring rigidly welded at its outer periphery to the inner periphery of the shell, a plurality of radially disposed and circumferentially spaced flat plates welded to the aft surface of the ring and to the inner periphery of the shell, said plates having a lesser width in the radially directed dimension than the radial width of the ring so that the ring provides an aft bearing surface, a second ring of lesser radial width than the first ring welded to the aft ends of the plates and at its outer periphery to the inner periphery of the shell, a torpedo tailcone, a joint ring for joining said tailcone to the shell, said joint ring being provided with an aft bearing surface falling in a plane normal to the torpedo axis, a jet motor comprising a housing having a nozzle secured to the aft end thereof projecting in the aft direction so that the nozzle opening is at the aft end of the tailcone, a thrust transmitting ring rigidly secured near the forward region of the jet motor housing, said thrust transmitting ring having a lesser outer diameter than the inner diameter of the joint ring whereby the jet motor may be inserted into the shell through the joint ring so that the thrust transmitting ring rests on the bearing surface of the first mentioned ring, a second thrust transmitting ring rigidly secured at a region of the jet motor housing so that this last mentioned thrust transmitting ring is adjacent and in facing relation to the bearing surface on the joint ring when the first thrust transmitting ring and the bearing surface of the first mentioned ring are in bearing contact.

6. In a torpedo structure, the combination of, a torpedo housing including a midsection and a tailcone, joint rings for securing the tailcone to the midsection, one of said joint rings being provided with a radially directed rib provided with a thrust receiving surface at the aft surface of the rib, a thrust receiving ring rigidly secured at its outer periphery to the inner surface of the midsection, a jet motor comprising a housing having a nozzle secured to the aft end thereof, said nozzle projecting in the aft direction so that the nozzle opening is at the aft end of the tailcone, a thrust transmitting ring rigidly secured near the forward region of the jet motor housing, said thrust transmitting ring having a lesser diameter than the internal diameter of the rib on one of the joint rings whereby the jet motor housing may be inserted through the rib so that the thrust transmitting ring may be brought in bearing relation on the aft surface of the thrust receiving ring, a second thrust transmitting ring rigidly secured to the jet motor housing at a region such that when the first thrust receiving ring and first thrust transmitting ring are in bearing contact this second thrust transmitting is in closely spaced bearing relation to the aftly facing bearing surface on the rib secured to one of the joint rings.

7. In a torpedo structure, the combination of, a torpedo housing including a midsection and a tailcone, joint rings for securing the tailcone to the midsection, one of said joint rings being provided with a radially directed rib provided with a thrust receiving surface at the aft surface of the rib, a thrust receiving ring rigidly secured at its outer periphery to the inner surface of the midsection, a plurality of gussets directed aftly of the thrust receiving ring rigidly secured at circumferentially spaced regions to the thrust receiving ring and the inner surface of the midsection, a jet motor comprising a housing having a nozzle secured to the aft end thereof, said nozzle projecting in the aft direction so that the nozzle opening is at the aft end of the tailcone, a thrust transmitting ring rigidly secured near the forward region of the jet motor housing, said thrust transmitting ring having a lesser diameter than the internal diameter of the rib on one of the joint rings whereby the jet motor housing may be inserted through the rib so that the thrust transmitting ring may be brought in bearing relation on the aft surface of the thrust receiving ring, a second thrust transmitting ring rigidly secured to the jet motor housing at a region such that when the first thrust receiving ring and first thrust transmitting ring are in bearing contact this second thrust transmitting is in closely spaced bearing relation to the aftly facing bearing surface on the rib secured to one of the joint rings.

8. In a torpedo structure, the combination of, a torpedo housing including a midsection and a tailcone, joint rings for securing the tailcone to the midsection, one of said joint rings being provided with a radially directed rib provided with a thrust receiving surface at the aft surface of the rib, a thrust receiving ring rigidly secured at its outer periphery to the inner surface of the midsection, a strengthening ring rigidly secured at its outer periphery to the inner surface of the midsection, a plurality of circumferentially spaced gussets disposed between the thrust receiving ring and the strengthening ring, said gussets falling in radial planes and at their forward ends are secured to the thrust receiving ring and their aft ends are secured to the strengthening ring and at the outer edges are secured to the inner surface of the midsection, a jet motor comprising a housing having a nozzle secured to the aft end thereof, said nozzle projecting in the aft direction so that the nozzle opening is at the aft end of the tailcone, a thrust transmitting ring rigidly secured near the forward region of the jet motor housing, said thrust transmitting ring having a lesser diameter than the internal diameter of the rib on one of the joint rings whereby the jet motor housing may be inserted through the rib so that the thrust transmitting ring may be brought in bearing relation on the aft surface of the thrust receiving ring, a second thrust transmitting ring rigidly secured to the jet motor housing at a region such that when the first thrust receiving ring and first thrust transmitting ring are in bearing contact this second thrust transmitting is in closely spaced bearing relation to the aftly facing bearing surface on the rib secured to one of the joint rings.

9. In a torpedo structure, the combination of, a torpedo housing including a midsection and a tailcone, joint rings for securing the tailcone to the midsection, one of said joint rings being provided with a radially directed rib provided with a thrust receiving surface at the aft surface of the rib, a thrust receiving ring rigidly secured at its outer periphery to the inner surface of the midsection, a plurality of gussets directed aftly of the thrust receiving ring rigidly secured at circumferentially spaced regions to the thrust receiving ring and the inner surface of the midsection, a strengthening ring rigidly secured at its outer periphery to the inner surface of the midsection and to the aft ends of the gussets, a jet motor comprising a housing having a nozzle secured to the aft end thereof, said nozzle projecting in the aft direction so that the nozzle opening is at the aft end of the tailcone, a thrust transmitting ring rigidly secured near the forward region of the jet motor housing, said thrust transmitting ring having a lesser diameter than the internal diameter of the rib on one of the joint rings whereby the jet motor housing may be inserted through the rib so that the thrust transmitting ring may be brought in bearing relation on the aft surface of the thrust receiving ring, a second thrust transmitting ring rigidly secured to the jet motor housing at a region such that when the first thrust receiving ring and first thrust transmitting ring are in bearing contact this second thrust transmitting ring is in closely spaced bearing relation to the aftly facing bearing surface on the rib secured to one of the joint rings.

10. In a torpedo structure, the combination of, a torpedo housing including a midsection and a tailcone, joint rings for securing the tailcone to the midsection, one of said joint rings being provided with a radially directed rib provided with a thrust receiving surface at the aft surface of the rib, a thrust receiving ring rigidly secured at its outer periphery to the inner surface of the midsection, a positioning ring having a greater internal diameter than the thrust receiving ring rigidly concentrically secured to the aft surface of the thrust receiving ring, a jet motor comprising a housing having a nozzle secured to the aft end thereof, said nozzle projecting in the aft direction so that the nozzle opening is at the aft end of the tailcone, a thrust transmitting ring rigidly secured near the forward region of the jet motor housing, said thrust transmitting ring having a lesser diameter than the internal diameter of the rib on one of the joint rings whereby the jet motor housing may be inserted through the rib so that the thrust transmitting ring may be brought in bearing relation on the aft surface of the thrust receiving ring, and be snugly disposed inside the positioning ring, a second thrust transmitting ring rigidly secured to the jet motor housing at a region such that when the first thrust receiving ring and first thrust transmitting ring are in bearing contact this second thrust transmitting ring is in closely spaced bearing relation to the aftly facing bearing surface on the rib secured to one of the joint rings.

11. In a torpedo structure, the combination of, a torpedo housing including a midsection and a tailcone, joint rings for securing the tailcone to the midsection, one of said joint rings being provided with a radially directed rib provided with a thrust receiving surface at the aft surface of the rib, a thrust receiving ring rigidly secured at its outer periphery to the inner surface of the midsection, a positioning ring rigidly secured to the aft surface of the thrust receiving ring and disposed in concentric relation to said thrust receiving ring, said positioning ring having a rectangular cross-section at the forward region and a trapezoidal cross-section at the aft region so that the positioning ring has a greater inner diameter at the aft region than at the forward region, a jet motor comprising a housing having a nozzle secured to the aft end thereof, said nozzle projecting in the aft direction so that the nozzle opening is at the aft end of the tailcone, a thrust transmitting ring rigidly secured near the forward region of the jet motor housing, said thrust transmitting ring having a lesser diameter than the internal diameter of the rib on one of the joint rings whereby the jet motor housing may be inserted through the rib so that the thrust transmitting ring may be brought in bearing relation on the aft surface of the thrust receiving ring, a second thrust transmitting ring rigidly secured to the jet motor housing at a region such that when the first thrust receiving ring and first thrust transmitting ring are in bearing contact this second thrust transmitting ring is in closely spaced bearing relation to the aftly facing bearing surface on the rib secured to one of the joint rings.

12. In a torpedo structure, the combination of, a torpedo housing including a midsection and a tailcone, joint rings for securing the tailcone to the midsection, one of said joint rings being provided with a radially directed rib provided with a thrust receiving surface at the aft surface of the rib, a thrust receiving ring rigidly secured at its outer periphery to the inner surface of the midsection, a strengthening ring rigidly secured at its outer periphery to the inner surface of the midsection, a plurality of circumferentially spaced gussets disposed between the thrust receiving ring and the strengthening ring, said gussets falling in radial planes and at their forward ends are secured to the thrust receiving ring and their aft ends are secured to the strengthening ring and at the outer edges are secured to the inner surface of the midsection, a positioning ring having a greater internal diameter than the thrust receiving ring rigidly concentrically secured to the aft surface of the thrust receiving ring, a jet motor comprising a housing having a nozzle secured to the aft end thereof, said nozzle projecting in the aft direction so that the nozzle opening is at the aft end of the tailcone, a thrust transmitting ring rigidly secured near the forward region of the jet motor housing, said thrust transmitting ring having a lesser diameter than the internal diameter of the rib on one of the joint rings whereby the jet motor housing may be inserted through the rib so that the thrust transmitting ring may be brought in bearing relation on the aft surface of the thrust receiving ring, and be snugly disposed inside the positioning ring, a second thrust transmitting ring rigidly secured to the jet motor housing at a region such that when the first thrust receiving ring and first thrust transmitting ring are in bearing contact this second thrust transmitting ring is in closely spaced bearing relation to the aftly facing bearing surface on the rib to one of the joint rings.

13. In a torpedo structure, the combination, a torpedo housing including a midsection and a tailcone, joint rings for securing the tailcone to the midsection, one of said joint rings being provided with a radially directed rib provided with a thrust receiving surface at the aft surface of the rib, a thrust receiving ring rigidly secured at its outer periphery to the inner surface of the midsection, a strengthening ring rigidly secured at its outer periphery to the inner surface of the midsection, a plurality of circumferentially spaced gussets disposed between the thrust receiving ring and the strengthening ring, said gussets falling in radial planes and at their forward ends are secured to the thrust receiving ring and their aft ends are secured to the strengthening ring and at the outer edges are secured to the inner surface of the midsection, a positioning ring having a greater internal diameter than the thrust receiving ring rigidly concentrically secured to the aft surface of the thrust receiving ring, said positioning ring having a rectangular cross-section at the forward region and a trapezoidal cross-section at the aft region so that the positioning ring has a greater inner diameter at the aft region than at the forward region, a jet motor comprising a housing having a nozzle secured to the aft end thereof, said nozzle projecting in the aft direction so that the nozzle opening is at the aft end of the tailcone, a thrust transmitting ring rigidly secured near the forward region of the jet motor housing, said thrust transmitting ring having a lesser diameter than the internal diameter of the rib on one of the joint rings whereby the jet motor housing may be inserted through the rib so that the thrust transmitting ring may be brought in bearing relation on the aft surface of the thrust receiving ring, and be snugly disposed inside the positioning ring, a second thrust transmitting ring rigidly secured to the jet motor housing at a region such that when the first thrust receiving ring and first thrust transmitting ring are in bearing contact this second thrust transmitting ring is in closely spaced bearing relation to the aftly facing bearing surface on the rib secured to one of the joint rings.

14. In a torpedo structure, the combination of, a torpedo housing including a midsection and a tailcone, joint rings for securing the tailcone to the midsection, and of said joint rings being provided with a radially directed rib provided with a thrust receiving surface at the aft surface of the rib, a thrust receiving ring rigidly secured at its outer periphery to the inner surface of the midsection, a jet motor comprising a housing having a nozzle secured to the aft end thereof, said nozzle projecting in the aft direction so that the nozzle opening is at the aft end of the tailcone, a thrust transmitting ring rigidly secured near the forward region of the jet motor housing, a second thrust transmitting ring disposed on the jet motor housing to be in bearing relation to thrust receiving surface on the rib, a bulkhead disposed transverse of the tailcone approximately at the mid-region of the tailcone, a flexible generally cylindrical bellows secured leakproof to the aft surface of the bulkhead and disposed concentrically about the nozzle, said bellows at the aft end being secured leakproof to the nozzle, whereby axial expansion of the jet motor housing and nozzle may readily take place and yet a leakproof bulkhead is maintained between the aft inner region of the tailcone and the closed forward region thereof, and means rigidly engaging the inner surface of the torpedo and the forward thrust transmitting ring to firmly connect the forward thrust transmitting ring to the thrust receiving ring.

15. In a torpedo structure, the combination of, a torpedo housing including a midsection and a tailcone, joint rings for securing the tailcone to the midsection, and of said joint rings being provided with a radially directed rib provided with a thrust receiving surface at the aft surface of the rib, a thrust receiving ring rigidly secured at its outer periphery to the inner surface of the midsection, a jet motor comprising a housing having a nozzle secured to the aft end thereof, said nozzle projecting in the aft direction so that the nozzle opening is at the aft end of the tailcone, a thrust transmitting ring rigidly secured near the forward region of the jet motor housing, a second thrust transmitting ring disposed on the jet motor housing to be in bearing relation to thrust receiving surface on the rib, a bulkhead disposed transverse of the tailcone approximately at the mid-region of the tailcone, a flexible generally cylindrical bellows secured leakproof to the aft surface of the bulkhead and disposed concentrically about the nozzle, said bellows at the aft end being secured leakproof to the nozzle, whereby axial expansion of the jet motor housing and nozzle may readily take place and yet a leakproof bulkhead is maintained between the aft inner region of the tailcone and the closed forward region thereof, means rigidly engaging the inner surface of the torpedo and the forward thrust transmitting ring to firmly connect the forward thrust transmitting ring to the thrust receiving ring, and a spring biased pressure relief valve in the bulkhead for discharging gas pressures that may develop in the forward region of the tailcone.

16. In a torpedo structure, the combination of, a torpedo housing including a midsection and a tailcone, joint rings for securing the tailcone to the midsection, and of said joint rings being provided with a radially directed rib provided with a thrust receiving surface at the aft surface of the rib, a thrust receiving ring rigidly secured at its outer periphery to the inner surface of the midsection, a jet motor comprising a housing having a nozzle secured to the aft end thereof, said nozzle projecting in the aft direction so that the nozzle opening is at the aft end of the tailcone, a thrust transmitting ring rigidly secured near the forward region of the jet motor housing, a second thrust transmitting ring disposed on the jet motor housing to be in bearing relation to thrust receiving surface on the rib, a bulkhead disposed transverse of the tailcone approximately at the mid-region of the tailcone, a flexible generally cylindrical bellows secured leakproof to the aft surface of the bulkhead and disposed concentrically about the nozzle, said bellows at the aft end being secured leakproof to the nozzle, whereby axial expansion of the jet motor housing and nozzle may readily take place and yet a leakproof bulkhead is maintained between the aft inner region of the tailcone and the closed forward region thereof, means rigidly engaging the inner surface of the torpedo and the forward thrust transmitting ring to firmly connect the forward thrust transmitting ring to the thrust receiving ring, the bulkhead being provided with a relatively large opening, and a relatively thin frangible metal sheet secured in leakproof manner to the aft surface of the bulkhead over the opening, whereby excessive pressures in the forward region of the tailcone may be rapidly discharged by the rupture of the metal sheet.

17. In a torpedo structure, the combination of, a torpedo housing including a midsection and a tailcone, joint rings for securing the tailcone to the midsection, and of said joint rings being provided with a radially directed rib provided with a thrust receiving surface at the aft surface of the rib, a thrust receiving ring rigidly secured at its outer periphery to the inner surface of the midsection, a jet motor comprising a housing having a nozzle secured to the aft end thereof, said nozzle projecting in the aft direction so that the nozzle opening is at the aft end of the tailcone, a thrust transmitting ring rigidly secured near the forward region of the jet motor housing, a second thrust transmitting ring disposed on the jet motor housing to be in bearing relation to thrust receiving surface on the rib, a bulkhead disposed transverse of the tailcone approximately at the mid-region of the tailcone, a flexible generally cylindrical bellows secured leakproof to the aft surface of the bulkhead and disposed concentrically about the nozzle, said bellows at the aft end being secured leakproof to the nozzle, whereby axial expansion of the jet motor housing and nozzle may readily take place and yet a leakproof bulkhead is maintained between the aft inner region of the tailcone and the closed forward region thereof, means rigidly engaging the inner surface of the torpedo and the forward thrust transmitting ring to firmly connect the forward thrust transmitting ring to the thrust receiving ring, a spring biased pressure relief valve in the bulkhead for discharging gas pressures that may develop in the forward region of the tailcone, the bulkhead being provided with a relatively large opening, and a relatively thin frangible metal sheet secured in leakproof manner to the aft surface of the bulkhead over the opening, whereby excessive pressures in the forward region of the tailcone may be rapidly discharged by the rupture of the metal sheet.

References Cited in the file of this patent

UNITED STATES PATENTS

| Number | Name | Date |
| --- | --- | --- |
| 1,303,039 | Dieter | May 6, 1919 |

FOREIGN PATENTS

| Number | Country | Date |
| --- | --- | --- |
| 123,245 | Great Britain | May 16, 1918 |